Nov. 15, 1966     J. J. TOROK     3,285,728
GLASS SHAPING PLUNGER WITH A MERCURY MASS
CONDENSER COOLING MEANS
Filed April 21, 1965     4 Sheets-Sheet 1

INVENTOR.
JULIUS J. TOROK
BY W. A. Schaich &
E. J. Holler
ATTORNEYS

INVENTOR.
JULIUS J. TOROK
BY W A Schaich &
E J Holler
ATTORNEYS

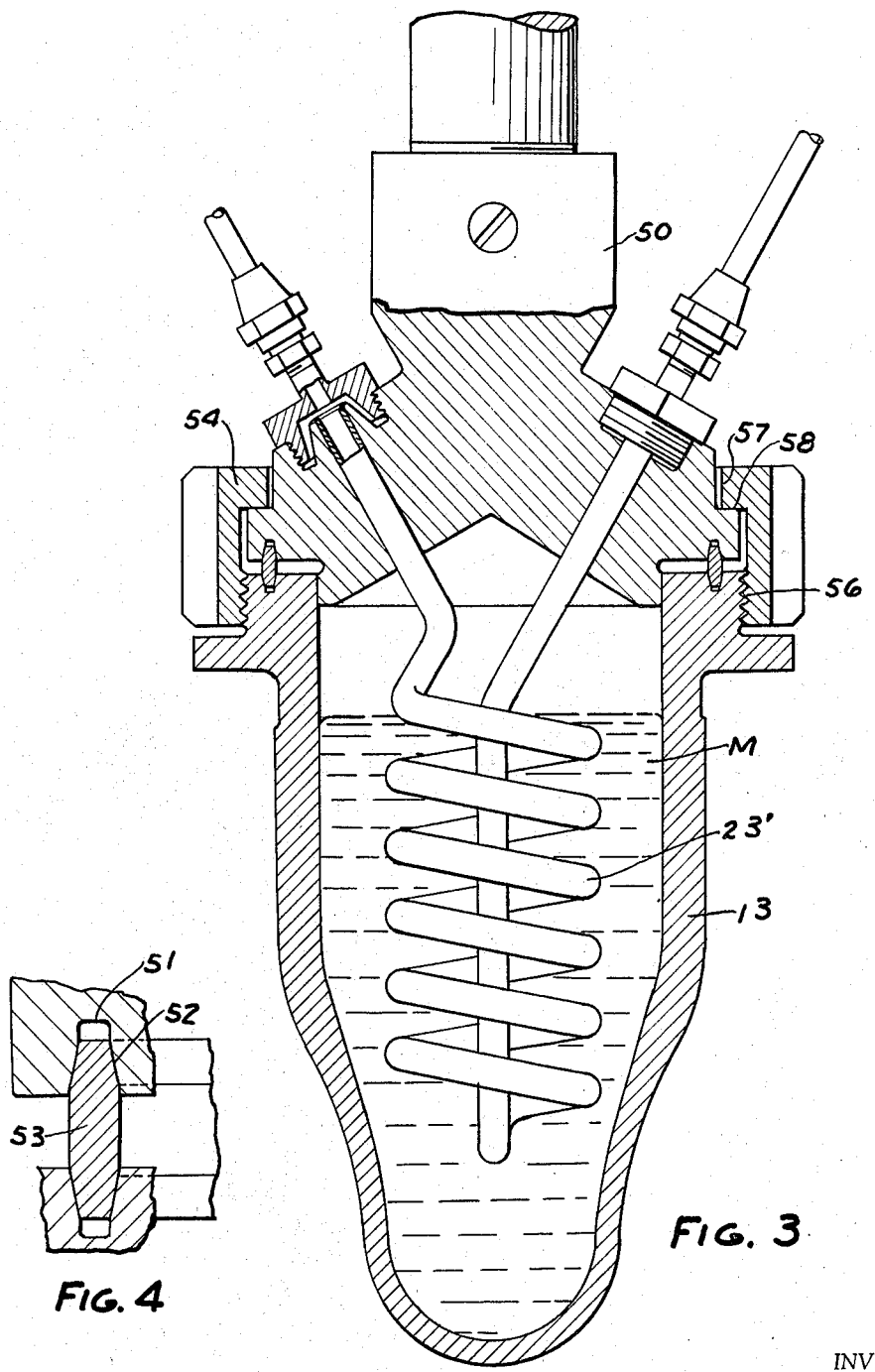

Nov. 15, 1966     J. J. TOROK     3,285,728
GLASS SHAPING PLUNGER WITH A MERCURY MASS
CONDENSER COOLING MEANS
Filed April 21, 1965     4 Sheets-Sheet 4

INVENTOR.
JULIUS J. TOROK
BY
ATTORNEYS

United States Patent Office 3,285,728
Patented Nov. 15, 1966

3,285,728
GLASS SHAPING PLUNGER WITH A MERCURY
MASS CONDENSER COOLING MEANS
Julius J. Torok, Toledo, Ohio, assignor to Owens-Illinois,
Inc., a corporation of Ohio
Filed Apr. 21, 1965, Ser. No. 451,683
6 Claims. (Cl. 65—162)

This application is a continuation-in-part of Serial No. 322,581, filed November 7, 1963, which in turn is a continuation-in-part of Serial No. 165,350, filed January 10, 1962, now abandoned.

This invention relates to the forming of articles by pressing a charge of molten material and particularly to the forming of glass articles by pressing.

A well-known method of forming articles or parisons of material such as glass for subsequent blowing into hollow articles is to introduce a charge or gob of molten material into a mold having an internal shape corresponding to the external shape of the article to be formed and press the charge of molten material by a plunger having an external surface corresponding to the internal surface of the article that is to be formed. The resultant article is then in desired final form or can be blown to desired final form in well-known machinery.

In the forming of glass articles or parisons by this method, it is extremely important to control the temperatures of the forming surfaces. If the forming surfaces are too hot, the glass will stick thereto necessitating a stoppage of the equipment for cleaning and repair. If the forming surfaces are too cold, the glass will crizzle or form what are commonly known as "chill wrinkles" that make the resultant glass articles unsatisfactory for use. It is therefore desirable and essential to operate the forming surfaces within a narrow range of temperatures to prevent the glass from sticking or crizzling.

One method of controlling the temperature of the forming surfaces, such as the temperature of the plunger surface, is to cool the plunger by utilizing air or water. Where air is used, great quantities are required, making the cooling quite expensive and the forming machinery quite noisy. In addition, when air is used, the amount of heat that can be removed is limited so that the rate or speed of operation of the forming machinery is limited. Where water is used, the speed of the machine is extremely limited because the machine must be operated within a narrow range of speeds which is determined by the temperature drop in the metal of the plunger regardless of the amount of water used for cooling. Speeds above this narrow range will cause overheating of the forming surface resulting in sticking of the molten charge. Speeds below this narrow range will cause the forming surface to cool to a temperature which will cause crizzling.

It is therefore an object of this invention to provide a novel method and apparatus for forming a charge of molten material, such as glass, by pressing permitting accurate variable control of the temperature of the forming surfaces.

It is a further object of this invention to provide a novel method and apparatus for accurately controlling the temperature of the forming surface of a forming part in the pressing of a charge of molten material.

It is a further object of the invention to provide such a method and apparatus which will permit wide variations in the speed of operation.

It is a further object of the invention to provide such a method and apparatus for accurately controlling the temperature of a pressing plunger.

It is a further object of the invention to provide a novel pressing plunger construction.

Basically, the invention comprises hermetically sealing in a hollow forming part, such as a plunger, a mass of a material which will boil at the forming temperatures, such as mercury when glass is being pressed and controlling the boiling of the material during the forming to thereby control the temperature of the forming surface of the plunger. The material should wet the inner surface of the forming part to obtain a lower interfacial temperature differential between the liquid coolant, i.e., mercury, and the inner surface of the forming part. Lower temperatures of operation of the plunger are obtainable by increasing condensation rates of the vapors of the material within the plunger. High condensation rates create low vapor pressures, and thus, lower boiling temperatures of the material. Low condensation rates allow the vapor pressure to raise, thus increasing the boiling point temperature of the liquid material. In the case where an inert gas is utilized, such gas is not normally condensed at the operating temperatures, but sets a minimum internal pressure, thus affecting the lowest achievable boiling temperature of the condensible material.

In the drawings:

FIGURE 3 is a partly diagrammatic part-sectional view of another form of apparatus embodying the invention.

FIGURE 4 is a fragmentary sectional view of a portion of the apparatus shown in FIGURE 3.

Figure 1:
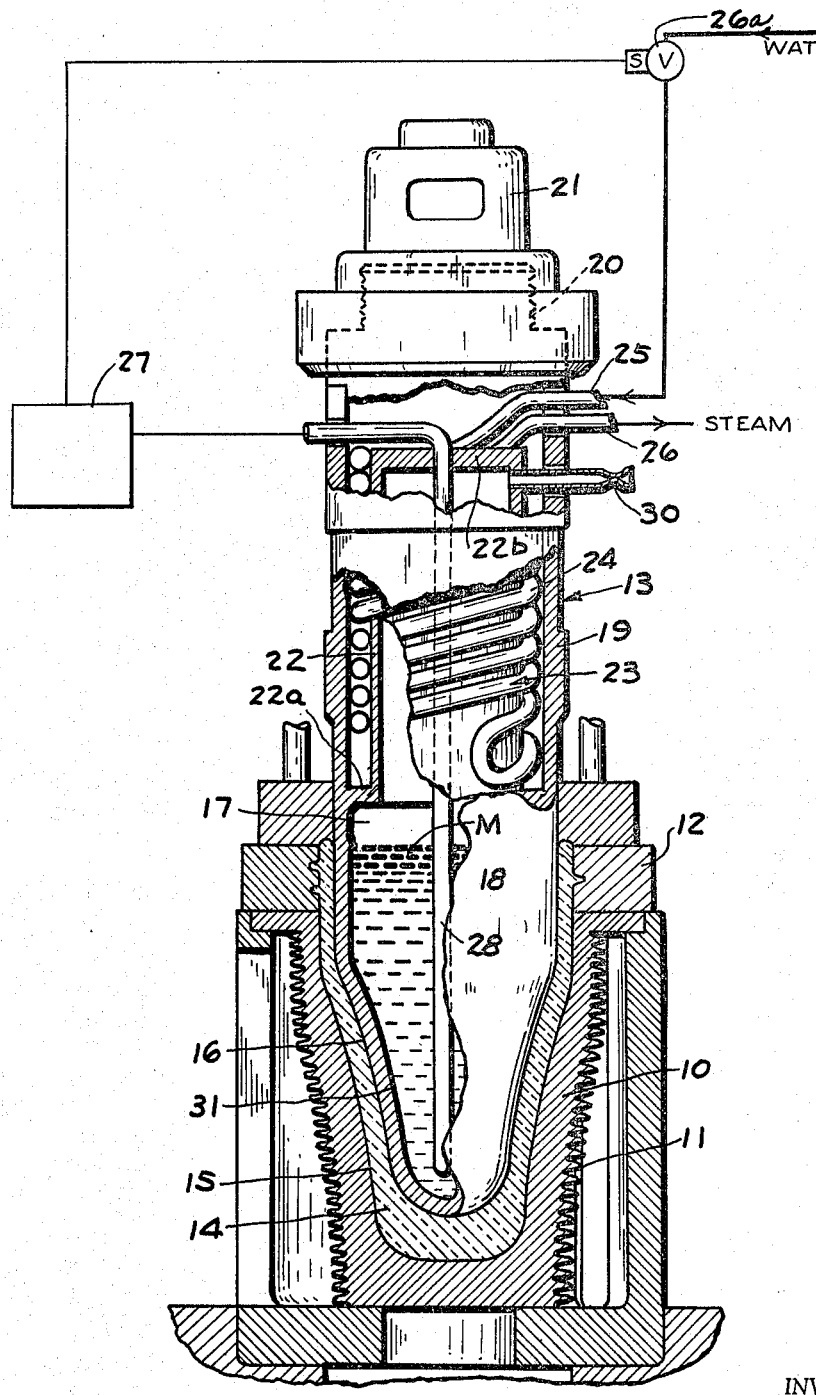
FIGURE 1 is a partly diagrammatic part-sectional view of an apparatus embodying the invention.

Referring to FIGURE 1, the apparatus is shown as part of a glass-forming machine for pressing a charge of glass into a hollow parison that is thereafter formed by blowing into the final desired shape. A charge of molten glass is introduced in a one-piece mold 10 that has the external surfaces thereof formed with ribs 11 and air is directed against the ribs to cool the mold 10. Such a construction can be of the type described in the patent to Weber, 2,688,823. A partible neck mold 12 is associated with the upper end of the mold 10.

An integral one piece plunger 13 embodying the invention is adapted to be moved downwardly within the mold cavity 14 to press the charge to the desired shape. The internal surface 15 of the mold cavity has a shape corresponding to the external surface of the article to be formed and the external surface 16 of the lower or glass forming end of plunger 13 has a shape corresponding to the internal surface of the articles to be formed.

According to the invention, the plunger 13 is hollow, forming a hermetically sealed chamber 17 that is partially filled with material M that wets the inner surface of the plunger and boils at the forming temperatures, which for glass is in the range of about 400°–1200° F. A highly satisfactory material comprises mercury alloyed with titanium and magnesium to form a wetting alloy of mercury. The mass M of mercury is introduced in such quantity that the level is slightly above the upper edge of the article formed in the mold. The thickness of the lower or glass forming end of the plunger is made less than conventional thickness but sufficient to provide adequate strength for pressing the charge of glass and to withstand the internal pressures of the mercury.

As shown in FIGURE 1, the upper portion 19 of the plunger is cylindrical and is formed with a projection 20 that is threaded into an adapter 21 which, in turn, is mounted in the appropriate reciprocating portion of the glass-forming machine so that the plunger can be moved into and out of the mold 10.

Hermetically sealed chamber 17 above the mass M of mercury is formed in the plunger 16 by an arrangement which includes an inner cylindrical wall 22 that is connected to the outer wall 19 by a horizontal flange 22a. The upper end of the wall 20 is closed by a horizontal top wall 22b. The inner wall 22 forms a part of the condenser 23 that is positioned adjacent the upper end of the plunger. The condenser 23 includes a tube 24 wound around the wall 22 through which a liquid coolant, such as water, is circulated to cool wall 22. The ends of the tubes 25, 26 extend exteriorly through the outer wall 19 of the plunger 13.

The flow of coolant through the tube 25 is controlled by a valve 26a which, in turn, is controlled by a temperature controller 27. The temperature controller 27 is operated by a thermocouple or similar temperature sensing element housed in tube 28 that extends downwardly through the top wall 22b into M of mercury. Preferably, the space 17 above the mass M of mercury is filled with dry inert gas or vacuumized. A suitable tube 30 extends through the walls 19 and 22 and can be used for removing the atmosphere above the mercury to create a vacuum, or replacing the atmosphere with an inert gas at a predetermined pressure.

The inner surface 31 of the plunger which contacted by the mercury M is cleaned so that it is readily wetted by the mercury. In addition, the mercury has suitable wetting agents therein, such as titanium and magnesium, so that the plunger surface 31 will be more readily wetted. A satisfactory material for the plunger comprises mild steel.

In the pressing of glass articles a preferred material for the forming plunger comprises Nitralloy steel having a composition as follows:

| | Percent |
|---|---|
| C | .38–.45 |
| Mn | .40–.70 |
| Si | .20–.40 |
| Cr | 1.40–1.80 |
| Al | .85–1.20 |
| Mo | .30–.45 |
| Balance Fe. | |

The addition of titanium and magnesium to mercury to improve the wetting properties thereof is described in a manual entitled "An Evaluation of Mercury Cooled Breeder Reactors," dated Oct. 31, 1959, prepared by Advanced Technology Laboratories, Division of American-Standard under Contract No. AT(04–3)–109, Project Agreement No. 4 for the U.S. Atomic Energy Commission, Division of Reactor Development which is available from the Office of Technical Services, Dept. of Commerce, Washington, D.C. The magnesium functions as an oxygen scavenger. Thus, the magnesium reacts much more readily with oxygen than does titanium thereby inhibiting any oxygen which is present from reacting with the titanium and destroying the effectiveness of said titanium.

Under the present invention it is preferred that an excess of titanium over that which will alloy with the mercury be utilized. Preferably 400–500 parts per million of titanium and 400–500 parts per million magnesium are added to the mercury. Although I do not wish to be bound by the theory it is believed that the titanium forms a corrosion resistant coating on the inner surface of the plunger, the mercury being extremely corrosive to the plunger material. By utilizing an excess, any titanium which is used up, so to speak, in forming the corrosion resistant layer is continuously replenished.

In the making of the plunger, the internal surface is cleaned throroughly so that it is activated and the mercury is introduced into the plunger through a suitable opening, such as tube 30, to a level slightly above the upper edges of the article which is formed when the plunger is moved into the mold. The space above the mercury is then evacuated and sealed or evacuated and replaced with a dry inert gas, such as argon or dry nitrogen. If an inert gas is used, the degree of pressure of gas in the space 17 determines the lowest temperature of operation of the plunger, that is, the boiling point of the mercury. In the device shown in FIG. 1, the space 17 is preferably under vacuum and the operating temperature of the plunger is controlled by adjusting the valve 26 through a temperature controller to vary or stop and start the flow of coolant through condenser 23 and thereby control the rate of vapor condensation of the mercury.

In operation, charges of glass are successively fed to the mold 10 and the plunger 13 is successively moved downwardly to press the charges of glass. The mass M of mercury within the plunger will boil during these operations and thereby remove heat from the external forming surface 16 of the plunger 13, accurately holding substantially all portions of the forming surface 16 at the desired temperatures. By controlling the vapor condensation through proper adjustment of the condenser 23, it is possible to maintain the plunger surface temperature at the desired level. If it is desired to operate the plunger at a faster speed so that the machine can be cycled at a faster speed, it is merely necessary to cool the condenser at a greater rate so that the vapor condensation will be greatly increased to remove the greater amount of heat. Because of the high temperatures involved, the water entering the tube 25 will, at normal operating speeds, leave the tube in the form of superheated steam.

Figure 2:
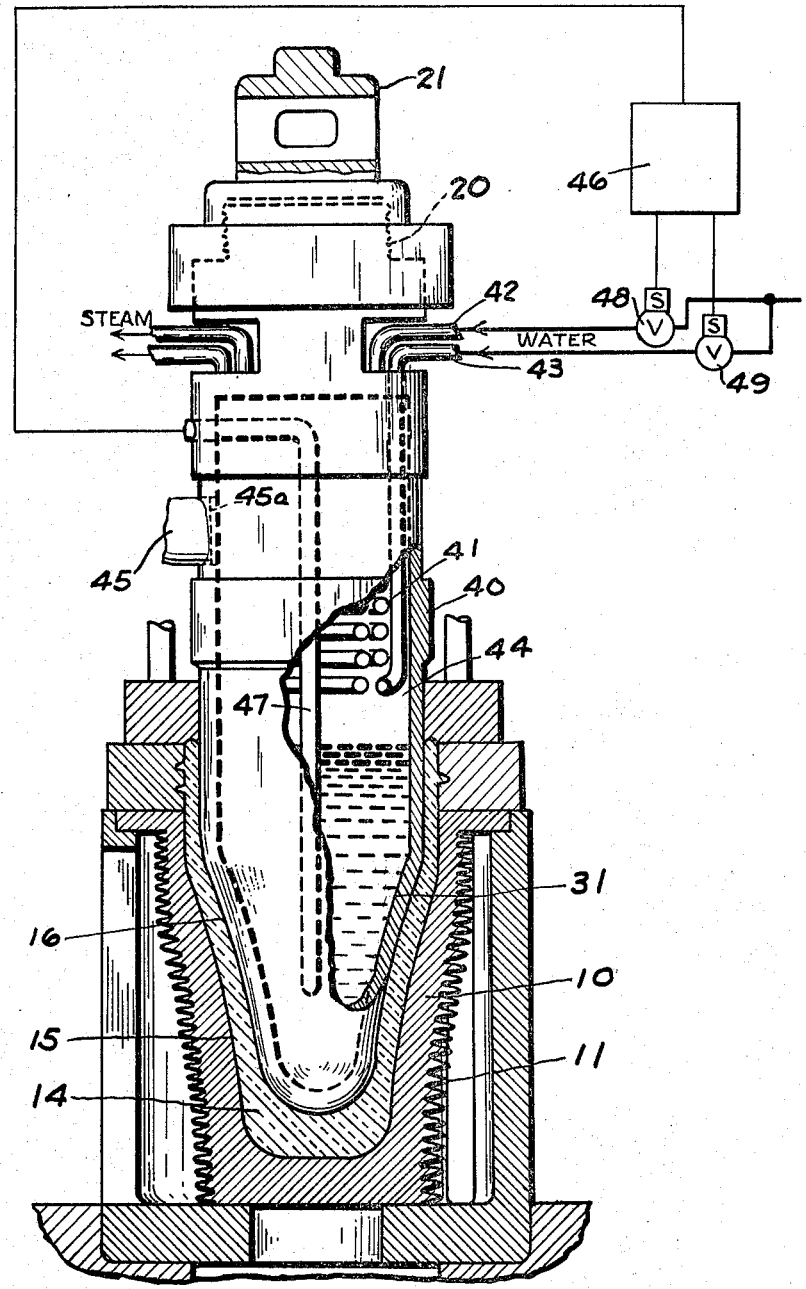
FIGURE 2 is a partly diagrammatic part-sectional view of a modified form of apparatus.

In the form of the invention shown in FIG. 2, plunger 40 is formed with condenser 41, comprising two sets of tubes 42, 43 positioned entirely within the space 44 above the mercury. The lowest temperature at which the plunger will be operated is determined by the pressure in the space 44 above the mercury. A pressure relief tube 45 having a rupturable disc 45a is provided as a safety device for chamber 44. Tube 45 is connected to a condenser or condensing system (not shown) to contain the mercury vapors upon rupture of safety disc 45a. A temperature controller 46, which is controlled by thermocouple 47, adjusts valves 48, 49, which control flow of coolant through the two parts 42, 43 of condenser 41 so that the maximum temperature of operation of the plunger can be adjusted.

In the modified form of the present invention shown in FIGS. 3 and 4, the condenser or cooling tubes of the condensing system are partially or fully immersed in the liquid phase of the coolant, i.e., mercury. Such construction facilitates shortening the vertical dimension and conserving cubical space in fabricating the plunger for its application to new or existing types of forming machines. In this construction, the boiling mercury and vapors thereof surround the condensing surfaces and the vapors are condensed thereby to control the temperature of the liquid metal. This arrangement also permits the plunger to be operated at temperatures at or below the minimum boiling temperature of the mercury as desired where little or no vaporization of the mercury is effected.

Specifically referring to FIG. 3, condenser 23' is fully immersed in the liquid mercury M.

As further shown in FIGS. 3 and 4, the plunger 13 is mounted on a head 50 by an arrangement which includes annular grooves 51 having tapered side wall surfaces 52 in the head 50 and plunger 13, respectively, and a sealing ring 53 made of deformable material such as interposed in the grooves. When the head 50 and plunger 13 are moved toward one another in assembly, the ring 53 is deformed into the groove 51 to provide a hermetic seal. A lock ring 54 having threads thereon is then threaded onto corresponding threads 56 on the upper end of the plunger 13 to bring a flange 57 on head 50 into engagement with the shoulder 58 and lock the plunger in position.

Figure 5:
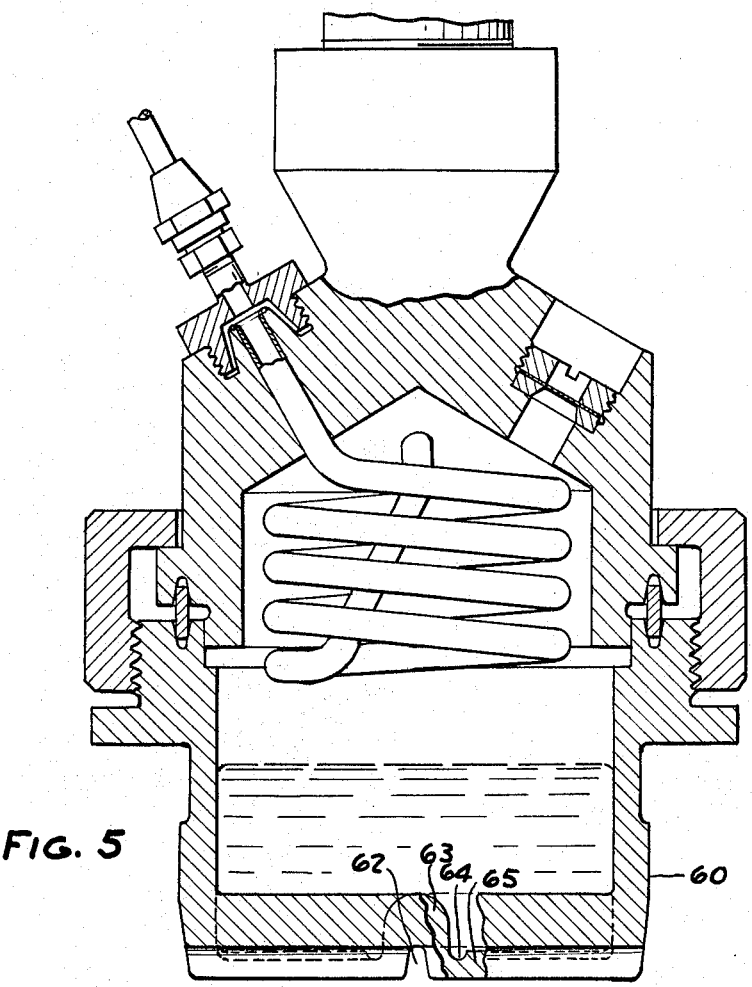
FIGURE 5 is a partly diagrammatic part-sectional view of a further modified form of the apparatus.
Figure 6:
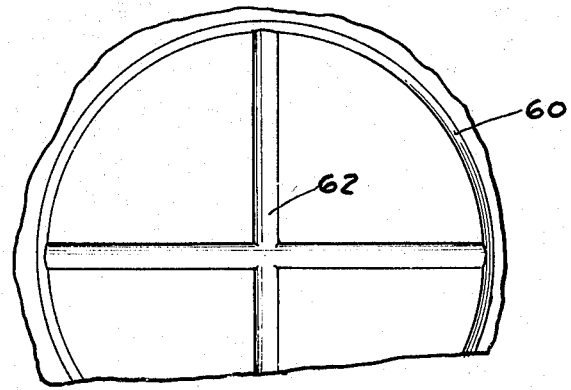
FIGURE 6 is a plan view of a portion of the apparatus shown in FIGURE 5.

In the form of the invention shown in FIGS. 5 and 6, the plunger 60 is utilized to form a glass part having grooves in the bottom portion thereof. Specifically, as shown in FIGS. 5 and 6, the outer surface 61 of the plunger is formed with groove 62 into which glass flows under pressing. In order to obtain a more uniform temperature distribution along the surface of the plunger when the plunger is operated at high temperatures, a large mass of plunger material 63 is provided above the groove 62 and an inwardly extending groove 64 is provided at the area of juncture of the flat portion 65 and the enlarged portion 63. The portion 63 permits heat to flow upwardly at a relatively slower rate in the thin areas of the web of glass while the groove 64 permits heat to flow outwardly at a greater rate in the areas where greater heat concentration occurs at the area juncture of the web of the glass and the flat portion of the glass.

In all other respects, the apparatus shown in FIGS. 5 and 6 is substantially identical to that shown in the other forms of the apparatus. It has been found that the plunger shown in FIGS. 5 and 6 can produce at high speeds what is known in the art as a quadrature dish. Heretofore, such a dish has been made by first pressing a flat dish and thereafter sealing solid pieces of glass to the bottom of the dish to form the dividing web.

In all forms of the apparatus, the temperature of substantially all portions of the forming surface can be accurately controlled throughout a wide range of heat input and pressing speeds. In addition, it is possible to operate the forming surface between a narrow range of temperatures so that the forming surface is neither too hot nor too cold. This is achieved by hermetically sealing a mass of a material which boils at the forming temperatures in the forming part and controlling the condensation of this material as it boils. As the pressing speed varies, the temperature sensing device varies the flow of coolant in the condenser to control the boiling and thereby maintain the desired surface forming temperature.

Although I do not wish to be bound by the theory involved, in my opinion, the beneficial results are achieved because the boiling material such as mercury boils at substantially the same temperature and thereby maintains the entire inner surface of the plunger at the same temperature. When the pressing speed is changed, a greater or lesser quantity of heat is transmitted to the mercury. This would tend to change the rate of evaporation of the mercury but the thermocouple changes the rate of flow of coolant through the condenser to change the rate of condensation and maintain the inner surface of the plunger at the same temperature.

Although the invention has been described in connection with the pressing of glass, it is also applicable to the pressing of other types of material such as plastics, in which case, it is only necessary to seal hermetically in the forming part, a material which will boil at the forming temperatures and is capable of wetting the inner surfaces of the forming part.

It can thus be seen that I have provided a novel method and apparatus for forming a charge of molten material by pressing wherein the temperature of the forming part, such as the plunger, is accurately controlled; wherein a wide variation and speed of operation can be achieved; wherein water is utilized as contrasted to air which is noisy and expensive; which provides a better quality selection of the resultant product; and which necessitates less maintenance and cost.

Various other modifications may be effected within the spirit and scope of the appended claims.

I claim:
1. A press forming element
having a wall with a glass forming surface and defining a hermetically sealed chamber,
a wetting alloy of mercury partially filling said chamber and having the properties of boiling at the operating temperatures of the press forming element,
said mercury having an upper level when the press forming element is in pressing position substantially at the peripheral edge of the article being formed,
a liquid cooled closed condenser positioned in said chamber in overlying relation to said wetting alloy of mercury,
said condenser having an inlet and an outlet extending from said condenser to the exterior of said element,
and means including sensing means within said chamber response to the temperature of the wetting alloy of mercury for controlling the flow of liquid coolant through said condenser and thereby controlling the rate of condensation of the vapor of said wetting alloy of mercury.

2. The press forming element set forth in claim 1 wherein said wetting alloy of mercury comprises magnesium and titanium, the amount of titanium being in excess of that capable of alloying with said mercury.

3. The press forming element set forth in claim 1 wherein said press forming element comprises
a head,
a hollow body having said aforementioned wall with said aforementioned external forming surface thereon,
means interconnecting said head and hollow body to form a hermetic seal and to define said aforementioned hollow chamber comprising
an annular sealing ring,
complementary annular grooves in said head and body respectively into which said sealing ring is compressed,
and means for locking said head and body against axially outward relative movement.

4. A press forming element
having a wall with a glass forming surface and defining a hermetically sealed chamber,
a wetting alloy of mercury partially filling said chamber and having the properties of boiling at the operating temperatures of the press forming element,
said mercury having an upper level when the press forming element is in pressing position substantially at the peripheral edge of the article being formed,
a liquid cooled closed condenser substantially entirely submerged within said wetting allay of mercury,
said condenser having an inlet and an outlet extending from said condenser to the exterior of said element,
and means including sensing means within said chamber responsive to the temperature of the wetting alloy of mercury for controlling the flow of liquid coolant through said condenser and thereby controlling the rate of condensation of the vapor of said wetting alloy of mercury.

5. The press forming element set forth in claim 4 wherein said wetting alloy of mercury comprises magnesium and titanium, the amount of titanium being in excess of that capable of alloying with said mercury.

6. The press forming element set forth in claim 4 wherein said press forming element comprises
a head, a hollow body having said aforementioned wall with said aforementioned external forming surface thereon, means interconnecting said head and hollow body to form a hermetic seal and to define said aforementioned hollow chamber comprising an anular sealing ring, complementary annular grooves in said head and body respectively into which said sealing ring is compressed, and means for locking said head and body against axially outward relative movement.

References Cited by the Examiner

UNITED STATES PATENTS

| | | | |
|---|---|---|---|
| 1,748,518 | 2/1930 | Midgley | 165—105 X |
| 2,990,693 | 7/1961 | Houplain | 165—105 X |
| 3,171,731 | 3/1965 | Barger et al. | 65—362 X |

FOREIGN PATENTS 491,846   9/1938   Great Britain.

DONALL H. SYLVESTER, *Primary Examiner.*

F. W. MIGA, *Assistant Examiner.*